(12) United States Patent
Lilja

(10) Patent No.: US 11,128,370 B2
(45) Date of Patent: Sep. 21, 2021

(54) DEVICE AND METHOD FOR GUIDING ELECTROMAGNETIC WAVES

(71) Applicant: StealthCase Oy, Tampere (FI)

(72) Inventor: Juha Lilja, Tampere (FI)

(73) Assignee: StealthCase Oy, Tampere (FI)

(*) Notice: Subject to any disclaimer, the term of this patent is extended or adjusted under 35 U.S.C. 154(b) by 0 days.

(21) Appl. No.: 16/832,738

(22) Filed: Mar. 27, 2020

(65) Prior Publication Data
US 2020/0228193 A1 Jul. 16, 2020

Related U.S. Application Data

(63) Continuation of application No. 15/505,311, filed as application No. PCT/FI2015/050535 on Aug. 19, 2015, now Pat. No. 10,659,140.

(51) Int. Cl.
| | |
|---|---|
| *H01Q 13/10* | (2006.01) |
| *H01Q 1/00* | (2006.01) |
| *H01Q 1/12* | (2006.01) |
| *H01Q 13/22* | (2006.01) |
| *H01Q 21/00* | (2006.01) |
| *H01Q 21/06* | (2006.01) |
| *H01Q 1/44* | (2006.01) |
| *H01P 3/12* | (2006.01) |
| *H04B 7/145* | (2006.01) |
| *H04B 7/155* | (2006.01) |
| *H01P 1/08* | (2006.01) |
| *H01Q 13/28* | (2006.01) |
| *H01P 7/06* | (2006.01) |

(52) U.S. Cl.
CPC ............. *H04B 7/145* (2013.01); *H01Q 1/007* (2013.01); *H01Q 1/1221* (2013.01); *H01Q 1/44* (2013.01); *H01Q 13/10* (2013.01); *H01Q 13/22* (2013.01); *H01Q 21/005* (2013.01); *H01Q 21/0056* (2013.01); *H01Q 21/064* (2013.01); *H04B 7/155* (2013.01); *H01P 1/08* (2013.01); *H01P 3/121* (2013.01); *H01P 7/06* (2013.01); *H01Q 13/28* (2013.01)

(58) Field of Classification Search
CPC ....... H01Q 1/007; H01Q 1/1214–1221; H01Q 1/1271
See application file for complete search history.

(56) References Cited

U.S. PATENT DOCUMENTS

| | | | | |
|---|---|---|---|---|
| 5,994,984 | A * | 11/1999 | Stancil ...................... | H01P 3/12 333/248 |
| 2007/0063914 | A1* | 3/2007 | Becker ..................... | H01Q 1/44 343/840 |
| 2014/0113671 | A1* | 4/2014 | Schwengler ........ | H04L 12/2801 455/517 |

* cited by examiner

*Primary Examiner* — Ricardo I Magallanes
(74) *Attorney, Agent, or Firm* — Ziegler IP Law Group, LLC

(57) ABSTRACT

A device for receiving and re-radiating electromagnetic signals. The device includes at least a wave guide with a first set of slot radiators for receiving electromagnetic signals, and a second set of slot radiators for transmitting electromagnetic signals generated on the basis of the received electromagnetic signals in the waveguide. The first set of slot radiators includes one or more slot radiators, and the second set of slot radiators includes one or more slot radiators. The device also relates to a method for receiving and re-radiating electromagnetic signals by a device including at least a waveguide, and the use of the device as a repeater of electromagnetic signals, for transferring electromagnetic signals through a structure, and/or as a building product.

9 Claims, 8 Drawing Sheets

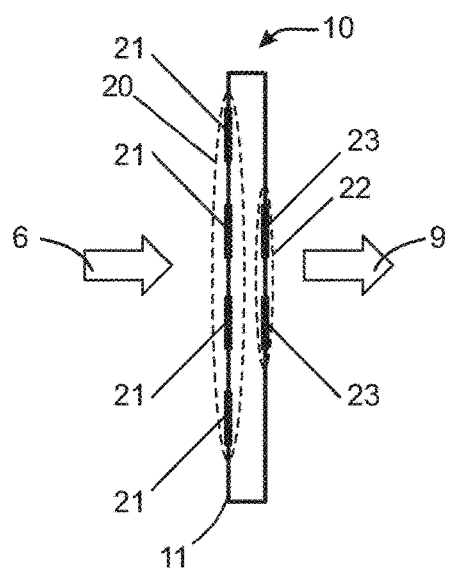 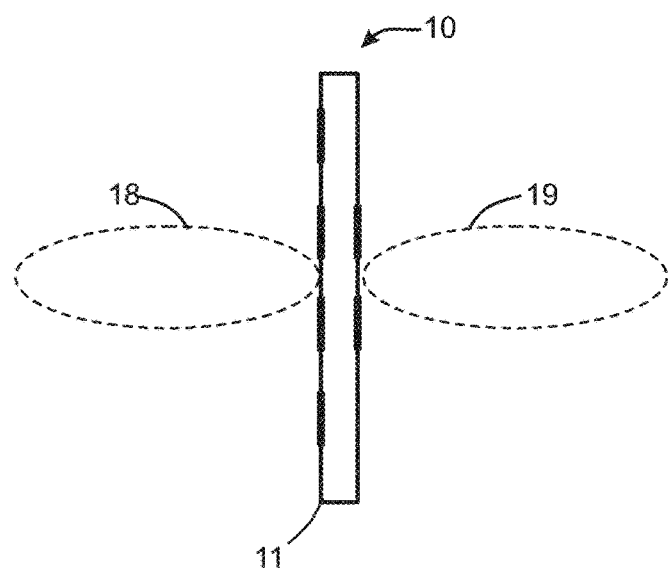
Fig. 4a    Fig. 4b
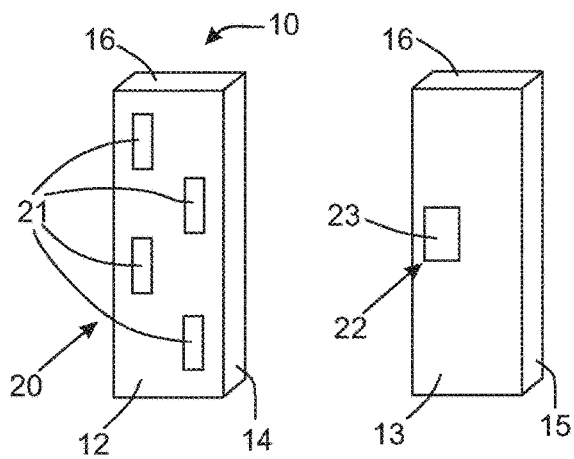 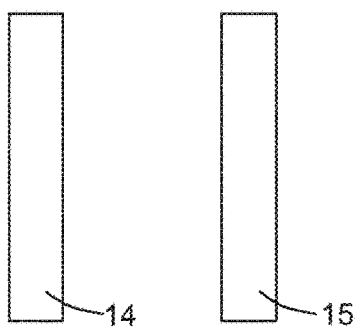
Fig. 5a    Fig. 5b    Fig. 5c    Fig. 5d
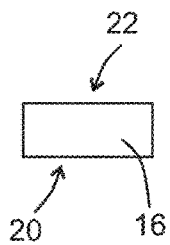 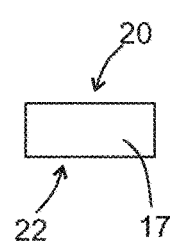
Fig. 5e    Fig. 5f

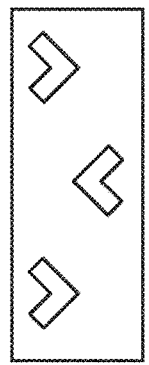 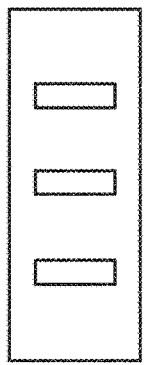 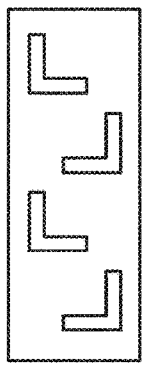 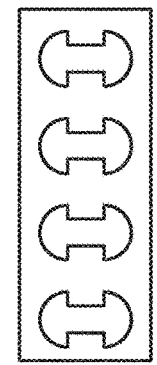 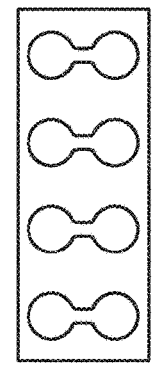
Fig. 6a    Fig. 6b    Fig. 6c    Fig. 6d    Fig. 6e
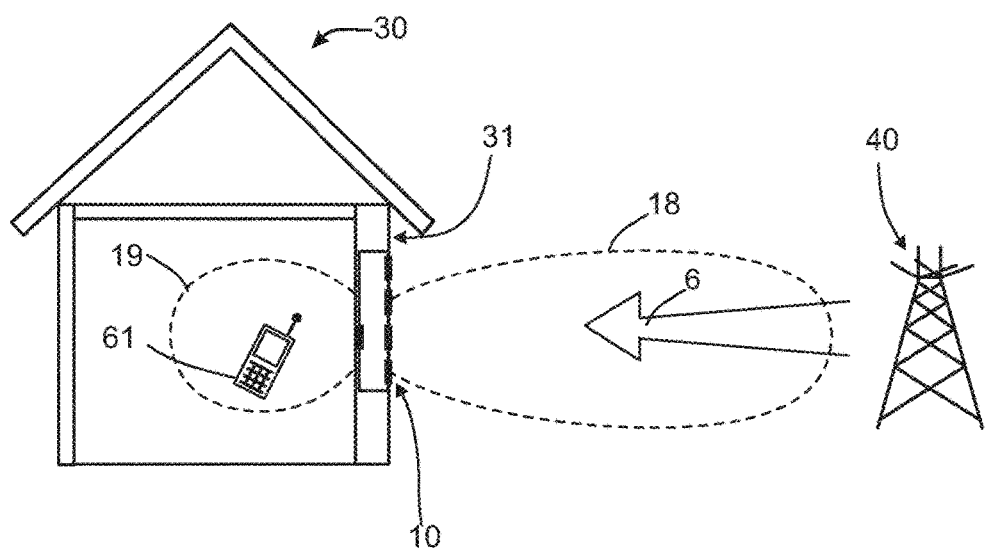
Fig. 7

DEVICE AND METHOD FOR GUIDING ELECTROMAGNETIC WAVES

TECHNICAL FIELD

The aspects of the disclosed embodiments relate to a device for guiding electromagnetic waves, comprising at least a waveguide. The invention also relates to a method for re-radiating received electromagnetic signals by a waveguide. Moreover, the aspects of the disclosed embodiments relate to the use of a structure that guides electromagnetic waves, for transmitting electromagnetic signals to a shadow area.

BACKGROUND

Aims of the construction industry to build passive and zero energy buildings are leading to a situation in which efficient thermal insulation strongly attenuates the signals of mobile phones and other wireless systems, wherein it may be even impossible to use a mobile phone inside a building. There are many reasons for the attenuation, but one reason that has been detected is the use of so called selective glass panes, that is, windows laminated with a conductive coating.

Conventionally, signals of wireless systems can enter buildings through windows, but the conductive coatings may cause an attenuation of even tens of decibels, depending on the frequency range. In addition to the windows, electromagnetic signals have previously been capable of passing through walls of buildings, but aluminium coated thermal insulation boards which are commonly used in walls today, efficiently prevent the propagation of signals into the buildings. Electromagnetic signals may also be attenuated by reinforcements in concrete structures, whereby when passing through such a structure, the signal strength may be reduced too much to be sufficient for the use of e.g. a mobile phone on the other side of the structure.

Attempts have been made to solve this problem by means of, for example, a passive antenna system that comprises two separate antennas and a transfer line connecting these two antennas. Furthermore, such a structure should be provided with a point of transition from each antenna to the transfer line. FIG. 1 shows an example of such a structure. The first antenna 1 can be, for example, a strongly directional Yagi antenna mounted outside a building. This antenna is provided with a transition to a cable 2, for example a solder joint between the central wire of the cable and the radiating element of the antenna. What is essential in this transition point is a change in the electromagnetic field distribution. A TEM waveform passes through the cable, and the currents of the cable are unbalanced. The Yagi current distribution, in turn, is balanced. In many cases, a so-called balun is additionally used in this transition point. A similar transition point is provided at the other end of the cable where the cable is soldered to a second antenna 3 of, for example, patch type, installed inside the building. Such an arrangement has, among other things, the drawback that the outdoor antenna may be difficult to position and may also be visually unaesthetic. These disadvantages are pronounced if several antennas have to be mounted, for example, on the roof of the building to provide a sufficient signal strength. If the apparatus also includes an amplifier 4 and a voltage supply 5 for the amplifier, it is an active system.

Other solutions are known as well, in which at least two separate antennas, transition points between the antenna and a transfer line, and the transfer line connecting the antennas can be identified. For example, international patent application WO 01/45303 A1 presents a module with antennas integrated on opposite faces of the module, and a transfer line placed inside the module, for transmitting electromagnetic signals received by the first antenna to the second antenna. Such a module can be, for example, built in lieu of a conventional brick in a brick wall. A drawback among other things in this solution, too, is that the fitting between the antennas and the transfer line is not lossless. Attenuation of the signal takes place in the transfer line as well.

Document JP 2010159564 presents a vertical ventilation duct for a skyscraper, where a tubular radiator is provided at each floor, intended to act as a transmitter of radio signals between the room and the ventilation duct. Thus, when an antenna, that is, an active element, is placed at one end of the ventilation duct, the signal can be conveyed in the ventilation duct from the antenna to the different floors.

Document JP 2008028549 presents a waveguide arrangement that is slightly similar to that of JP 2010159564, in which e.g. an antenna of a LAN base station can be placed in the waveguide, and wireless terminals can transmit and receive via slots formed in the waveguide. Each embodiment presents a base station antenna placed in a waveguide and thus used as an active element. The waveguide is also provided with one or more tubular waveguides acting as emitters for terminals.

BRIEF SUMMARY

It is an aim of the disclosed embodiments to improve the state of the art and to provide a structure with enhanced properties for transmitting electromagnetic signals through the structure. In the present solution according to the invention, there are no two separate antennas, and the received signal is not transmitted to a receiver or another antenna along a transfer line but by means of slot radiators and a waveguide. An electromagnetic wave incident on the structure according to this invention will induce surface currents on the metal surfaces of the structure, which surface currents are arranged to immediately emit in a desired direction. The structure used is a resonant cavity which can be fabricated of, for example, a rectangular wave guide. In such a structure, one wall comprises one slot radiator or a set formed of more than one slot radiator. This wall is oriented toward the direction of incidence of the signal (away from the house, for example toward a base station). Another wall of the structure also comprises at least one slot radiator for emitting the field distribution generated in the structure in a desired direction. The above mentioned slot radiators are preferably designed to cut surface currents caused by the field distribution (mode) formed in the structure, on the outer walls of the cavity. Said modes are dependent on e.g. the frequency range used and the dimensions of the cavity. A conventional mode used in waveguide antennas is TE10 which is excited at the lowest frequency. The function of the structure is not limited to the TE10 mode only, but it is also possible to use an overmoded waveguide structure (TE10+TE20+TE20, etc). TM modes can be used as well.

To put it more precisely, the waveguide according to the disclosed embodiments is primarily characterized in that the waveguide comprises a first set of slot radiators for receiving electromagnetic signals, consisting of one or more slot radiators, and a second set of slot radiators, consisting of two or more slot radiators, for transmitting electromagnetic signals generated in the waveguide on the basis of the received electromagnetic signals. The method according to the disclosed embodiments is primarily characterized in that the method comprises receiving electromagnetic signals by a first set of slot radiators consisting of one or more slot radiators, and transmitting electromagnetic signals generated in a waveguide on the basis of the received electromagnetic signals, by a second set of slot radiators consisting of two or more slot radiators. The first use of a waveguide according to the disclosed embodiments is primarily characterized in that the waveguide is used as a repeater for electromagnetic signals. The second use of a waveguide according to the disclosed embodiments is primarily characterized in that the waveguide is used for transmitting electromagnetic signals through a structure that attenuates electromagnetic signals. The third use of a waveguide according to the disclosed embodiments is primarily characterized in that the waveguide is used as a building product. Finally, a device according to a preferred embodiment of the invention is primarily characterized in that the device comprises means for receiving electromagnetic signals from a first set of slot radiators consisting of one or more slot radiators, and means for transmitting electromagnetic signals generated in a waveguide on the basis of the received electromagnetic signals, by a second set of slot radiators consisting of two or more slot radiators.

Some advantageous embodiments of the invention are presented in the dependent claims.

The disclosed embodiments shows some advantages over the solutions of prior art. The passive waveguide according to the invention can be used to enhance the propagation of some electromagnetic signals through a structure that significantly attenuates such signals, whereby reception of these electromagnetic signals can be achieved even in spaces where the electromagnetic signals could not be received otherwise. Furthermore, the waveguide according to the invention can be used to improve the reception of signals in other types of shadow areas as well. By its principle of operation, the waveguide according to the invention is a passive waveguide, so that there is no need for an external energy source or active signal amplifiers. Moreover, it is not necessary to connect a feeder cable to the waveguide, which also simplifies the structure and use of the device. Because no feeder cable is needed, there will not be any junction losses either which occur between the feeder cable and the antenna in the solutions of prior art.

By means of the waveguide according to the invention, an electromagnetic signal can thus be brought to shadow areas in which the field strength has been otherwise damped. The waveguide can be used to guide an electromagnetic wave in a desired direction depending on, for example, the design and the structure of the waveguide.

Smaller RF losses achieved by the waveguide, resulting from e.g. the fact that there is no need for a cable, give a better efficiency and thereby a larger reception area than a system implemented with a cable.

In an advantageous embodiment of the invention, the material for fabricating the structure is aluminium coated thermal insulation board that is used in buildings. For this reason, when installed in a wall, the waveguide according to this embodiment of the invention can also improve the thermal insulation of the building, so that it also has a non-electromagnetic functionality.

The structure of the waveguide according to the invention is simpler compared with a conventional passive antenna repeater system. Moreover, the structure can be hidden inside the wall of a building, whereby it is not visually unaesthetic in the same way as conventional large rake antennas. Several structures can be embedded in the wall, whereby their combined action is pronounced and the effective area is increased. There is no need for a transition point between the antenna and the transfer line in the structure, which brings significant savings in the manufacturing costs. For example, a transition element between a waveguide and a coaxial cable can cost hundreds of euros. In the structure according to the disclosed embodiments, there is no such transition point. Because no separate elements are needed, there are no breakable parts, which makes the structure more reliable.

DESCRIPTION OF THE DRAWINGS

In the following, the disclosed embodiments will be described in more detail with reference to the appended drawings, in which

FIG. 4a is a principle view showing the structure of a device according to an embodiment of the invention;

FIG. 4b is a reduced view illustrating the radiation patterns of the device shown in FIG. 4a;

FIGS. 5a to 5f show a device according to a preferred embodiment of the invention, seen from different directions;

FIGS. 6a to 6e show some possible geometries of slot radiators;

FIG. 7 is a principle view showing an example of placing a device according to FIG. 4a in connection with a building;

DETAILED DESCRIPTION OF SOME EXAMPLES

For the sake of clarity, some terms used in the description are now defined. A waveguide refers to a conductive structure that is capable of receiving electromagnetic radiation and re-radiating this received electromagnetic radiation. The waveguide is a tubular structure consisting of or coated with a conductive material, and intended for transmitting electromagnetic signals, particularly signals of high frequency (UHF, microwave range). The cross-sectional shape of the waveguide can be rectangular, square, triangular, polygonal, circular, or any other cross-sectional shape suitable for the purpose. A cavity resonator refers to a structure in which, upon propagation of electromagnetic signals, standing waves are formed at a frequency specific to the cavity resonator, that is, at the resonance frequency, or its multiples. To make this possible, the cavity resonator is provided with a surface that reflects electromagnetic radiation back, such as an end or ends of the cavity resonator. Thus, the cavity resonator is a waveguide whose at least one end is provided with a short circuit structure. A slot radiator refers to substantially non-conducting discontinuities in a conducting surface where an electrical current cannot propagate straight forward but has to bypass this point. Across such a discontinuity, electric and magnetic fields are thus formed whose magnitude and direction are affected by, among other things, the geometry of the slot. The shape of the slot radiator is advantageously an elongated slot-like opening; in other words, the dimension of the slot in one direction is clearly greater than the dimension of the slot in another direction, but it can also be e.g. circular. A slot radiator can also be called an aperture radiator.

Figure 1:
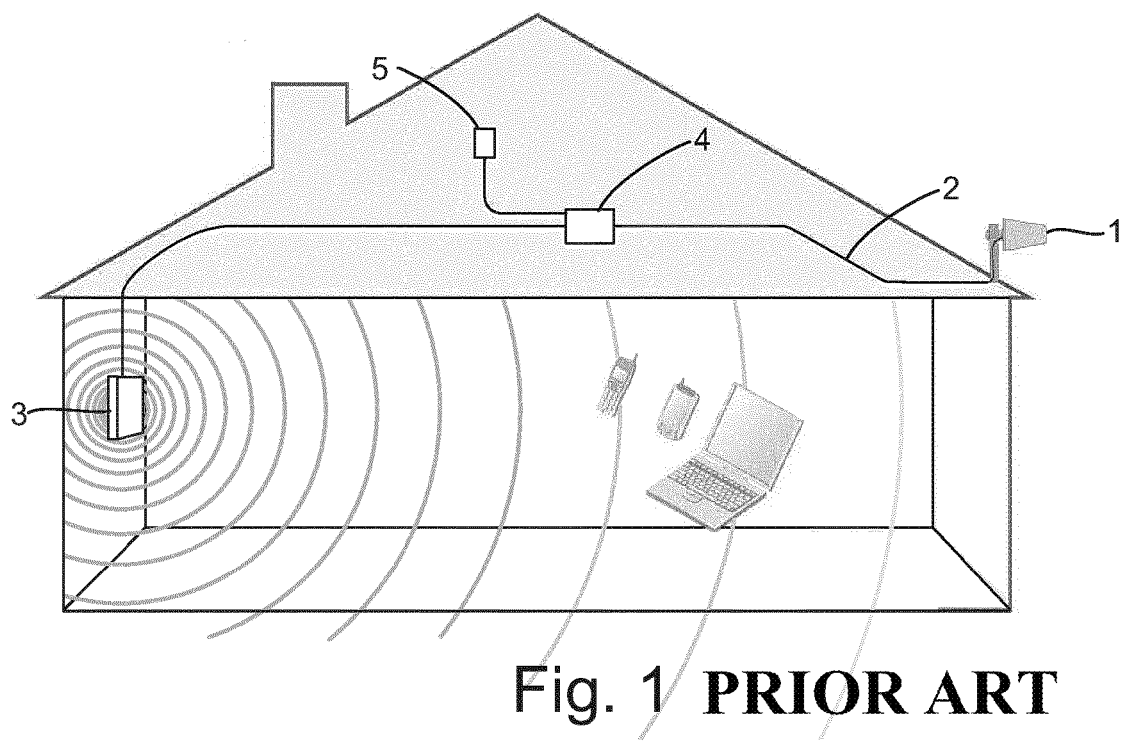
FIG. 1 shows a solution of prior art for implementing a passive repeater.
Figure 2:
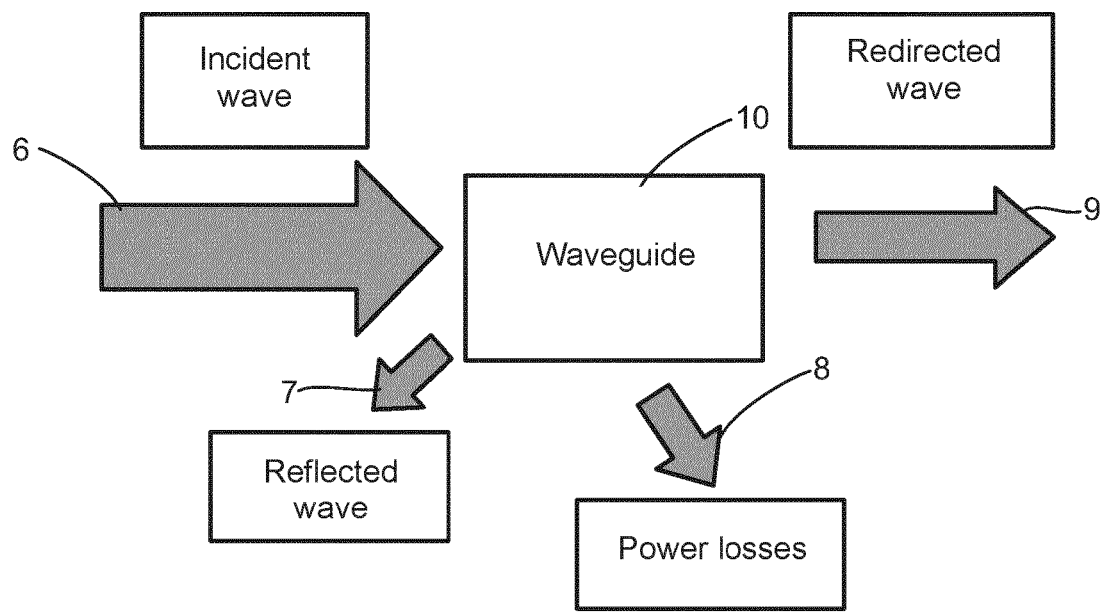
FIG. 2 is a reduced view showing the principle of operation of a device according to the invention for guiding electromagnetic waves.

FIG. 2 illustrates the principle of operation of a waveguide 10 according to the disclosed embodiments in a reduced view, and FIG. 4a shows a principle view of the structure of a waveguide 10 according to an embodiment of the invention, and FIG. 4b shows a reduced view of radiation patterns 18, 19 of the waveguide 10 according to FIG. 4a. The waveguide 10 comprises a first set 20 of slot radiators for receiving electromagnetic signals, and a second set 22 of slot radiators for re-radiating the received electromagnetic signals. The slot radiators of the first set 20 of slot radiators receive electromagnetic signals 6. These electromagnetic signals are not necessarily transferred completely into the waveguide 10, but the signals are partly reflected 7 without entering the waveguide 10. Losses 8 can also take place in the waveguide 10 for a number of reasons, so that the received electromagnetic signals can be attenuated to some extent in the waveguide according to the invention, too. The attenuation is mostly due to metal conductor losses, as well as electrical losses in the insulation material, although these are considerably smaller losses than, for example, losses that take place in a coaxial cable. By means of the second set 22 of slot radiators, it is possible to re-radiate the received electromagnetic signals; in other words, the waveguide 10 emits 9 the electromagnetic signals received by it. Thus, the waveguide 10 acts as a kind of a passive repeater for the electromagnetic signals. The direction of these re-radiated signals can deviate from the direction of the received signals, as will be described further below in this description.

In FIG. 4b, reference numeral 18 indicates a broken line illustrating a possible radiation pattern of the first set 20 of slot radiators, and in a corresponding way, reference numeral 19 indicates a broken line illustrating a possible radiation pattern of the second set 22 of slot radiators.

The material used for the waveguide 10 is preferably a conductive material, such as sheet metal, conductive plastic, or the like. The sheet metal used can be, for example, aluminium or copper sheet. Another possibility is to use a less conductive material or an electrical insulator that is treated to become conductive, for example by providing the material with a conductive coating.

The waveguide 10 constitutes a resonant structure, a kind of a cavity resonator, whose resonance frequency depends on e.g. the dimensions of the structure and the shapes and placement of the slot resonators. The aim is to select the resonance frequency to be close to the frequency range intended for the waveguide 10. For example, to enhance the propagation of signals from base stations of a mobile network operating in the frequency range of 900 MHz, through a structure, such as the outer wall of a building, the resonance frequency should be set close to 900 MHz. This is only one non-limiting example of a frequency range in which the invention can be applied. Other frequency ranges commonly used in radio frequency communication include 800 MHz, 1800 MHz, 1900 MHz, 2.1 GHz, 2.4 GHz, 2.6 GHz, and 5 GHz. In some cases, the waveguide 10 can operate in even more than one frequency range, such as multiples of a basic frequency (for example, 900 MHz and 1800 MHz). However, the mode of operation may be different in these different frequency ranges; for example, the mode can be TE10 at the basic frequency, whereas the mode can be TE20 at the first-order frequency.

The slot radiators of the first set 20 of slot radiators in the waveguide 10 are advantageously placed on one surface of the cavity resonator. Their shape in the direction of the plane of the waveguide 10 is preferably such that the diameter of the slot in one direction is different from the diameter of the slot in another direction. In other words, the shape of the slots is not circular. Advantageous shapes include a rectangle and an oval, but also other shapes are feasible. The first set 20 of slot radiators preferably comprises at least two slot radiators 21 in order to achieve some amplification of the signals to be received, in comparison with the situation of a single slot. The slot radiators 21 can be arrayed in one or more rows, for example as a matrix. On the other hand, if slot radiators 21 are arrayed in two or more rows, the slot radiators 21 of adjacent rows are not necessarily aligned, so that the electrical and/or magnetic fields induced by the slot radiators 21 would not cancel each other out. By the number and mutual positioning of the slot radiators 21, it is possible to influence, among other things, the directional pattern, that is, the direction from which incoming signals are received in the most effective way.

The slot radiators of the second set 22 of slot radiators in the waveguide 10 are also placed on one surface of the cavity resonator, which is not necessarily the same surface as the surface with the slot radiators of the first set 20 of slot radiators. The placement of the second set 22 of slot radiators is influenced, among other things, by the direction in which the electromagnetic signals received by the waveguide 10 are to be retransmitted. In some cases, the first set 20 of slot radiators and the second set 22 of slot radiators are on opposite surfaces of the cavity resonator. Various possibilities for placement of the sets 20, 22 of slot radiators will be described in more detail further below in this description.

The second set 22 of slot radiators may comprise, for example, only one or more than one slot radiator. In this second set of slot radiators, too, the shape of the slot radiators in the direction of the plane of the waveguide 10 is preferably such that the diameter of the slot in one direction is different from the diameter of the slot in another direction. Advantageous shapes include a rectangle and an oval, but also other shapes are feasible. The second set 22 of slot radiators preferably comprises at least two slot radiators 23, in order to achieve some amplification of the signals to be received, in comparison with the situation of a single slot. The slot radiators 23 can be arrayed in one or more rows, for example as a matrix. On the other hand, if the slot radiators 23 are arrayed in two or more rows, the slot radiators 23 of adjacent rows are not necessarily aligned, so that the electrical and/or magnetic fields induced by the slot radiators 23 would not cancel each other out. By the number and the mutual positioning of the slot radiators 23, it is possible to influence, among other things, the directional pattern, that is, the direction in which the waveguide 10 emits electromagnetic signals in the most effective way.

In some cases it is advantageous that the directional pattern of the second set 22 of slot radiators is relatively large, so that the signals re-radiated by the waveguide 10 can be received in a relatively large area. Thus, the second set 22 of slot radiators preferably comprises only one, two, or few slot radiators 23. Such a situation can occur, for example, when electromagnetic signals are to be transmitted through wall into a room, into a space as large as possible in said room.

We shall now elucidate the theoretical background of the waveguide 10 according to the invention.

The waveguide is a transfer line consisting of a single conductor whose metal boundary conditions, geometrical dimensions and the frequency range in question determine the field pattern formed in it. The field patterns, i.e. modes, are excited as the frequency increases and the cutoff frequency is exceeded. The most commonly utilized mode with a rectangular waveguide is TE10 (Transverse Electric), but other modes can also be utilized for repeater use. TE and TM modes are listed according to the half wavelengths fitting within the dimensions of the cross-sectional area. In the TE mode, the electric field oscillates in a direction transverse to the direction of propagation of the electromagnetic signal, and in the TM mode, correspondingly, the magnetic field oscillates in a direction transverse to the direction of propagation of the electromagnetic signal but orthogonal to the direction of the electric field. The TE10 mode is utilized because of its simplicity. In so-called overmoded waveguides, the field distribution is a superposition of several different modes. With long waveguide structures, the small losses of the TE10 mode are more pronounced as an advantage to higher modes. However, the emission by the structure is not limited to the first mode only.

The waveguide becomes a cavity resonator when at least one of its ends is short circuited. Thus, the wave reflected from the short circuited end will form a standing wave pattern in the waveguide. The field strength of the different modes can be influenced by adjusting the length of the cavity resonator and thus by the locations of the short circuits. The wavelengths of the different modes in the cavity resonator differ from each other, whereby it is possible to intensify the strength of the standing wave of the desired modes only. Further, by taking into account the maxima of the surface currents of the different modes in the cross-sectional projection of the waveguide, the strength of the modes can also be influenced by shifting the location of the short circuit. In other words, the short circuit at the end of the waveguide does not necessarily have to cover the whole cross-sectional pattern.

The electric and magnetic fields resonating in the waveguide generate surface currents on the conductive surfaces of the cavity, which currents are represented by equations defined by Maxwell's equations. The tangential component of the electric field substantially dissipates on surfaces of a good conductor, and on conductive surfaces the electric field is aligned with the normal of the surface. The magnetic field, in turn, retains its tangential component which is substantially equal to the surface current induced on the surface. Examining one mode at a time, the maxima of the standing wave pattern are repeated at half wave intervals. In this case, reference is made to the wavelength in the waveguide, which is greater than the wavelength in free space. When these current patterns formed on the surface are interfered by particular cuts, such as incisions, the slots start to radiate, thanks to the currents circling them. In the radiating slots, it is also possible to detect a difference in potential between the two adjacent edges of the slot, induced by the currents circling them. The radiation by the slot is intensified when it is tuned to resonance at a desired operating frequency.

Several slots can be arrayed in a row, taking into account the field patterns of all the excited waveguide modes and the surface currents induced by them. Arrayed in a row, the radiating resonant slots act as an antenna array, so that the radiation pattern formed by them can be examined by well-known rules for designing antenna arrays. The most important of these include the determination of array and element coefficients. In overmoded waveguides, an increase in the frequency will excite a new mode that affects the radiation properties of the structure. In the slot radiators cut in the structure, the currents of two different modes may either cancel or amplify each other. A change in the currents will thus affect the radiation patterns formed in the different modes as well.

With a conventional rectangular waveguide antenna array, it is known that horizontally polarized radiation can be produced in the TE10 mode by cutting the wider wall of the structure. Vertically polarized radiation is normally produced by cutting the narrower wall of the structure. In overmoded waveguides, a complex current pattern on each surface allows the radiation of both polarizations from the wider wall of the structure.

A passive waveguide repeater is linear and reciprocal in its function. The properties of the radiating slot are equal in both transmission and reception. This applies to an array (set) formed of slots as well. When a cavity resonator is provided with radiating slots in two separate areas so that one set of slot radiators faces the incoming payload signal and the other set faces the shadow area, the following takes place: An incoming electromagnetic wave encounters the resonant slot radiators on the structure. The incoming electric field adapts to the dimensions of the slot radiator and generates an electro-motive force induced by the above described difference in potential between the two adjacent edges of the slot. This produces a circuit pattern circling the slot and corresponding to the current pattern forming in a situation of transmission. Inside the cavity resonator, the surface currents excite a resonant wave pattern that is the strongest in the modes for whose function the array and the dimensions of the slots were designed. The field pattern oscillating in the structure forms a surface current pattern on the conductive walls, according to Maxwell's equations.

The current pattern formed in the structure circles each conductive surface of the cavity resonator. When the generated surface currents encounter another slot, it will start to radiate if the slot intersects the path of the current. When this new slot is placed in a shadow area, it is possible to passively transfer electromagnetic energy from an area with a good signal level to a shadow area by means of the re-radiating slot radiator. The number of slot radiators can be one or more. The placement of several slot radiators one after the other can strongly amplify an incoming signal from a desired direction. With this increase in the amplification, the efficiency of the structure for incoming signals from desired direction can increase significantly. Without increasing the amplification, the efficiency may remain so low that there is no practical use to be obtained from the passive repeater in bringing signals to shadow areas. The most common distance for the distance of slot radiators in a waveguide of the TE10 mode is a half wavelength. In overmoded waveguides, parallel slot radiators can be used for increasing the radiation efficiency of the structure.

It is well known that conventional passive antenna repeater structures have low efficiency. The cable to be connected between the two antennas often attenuates the signal so much that the benefit obtained from the passive repeaters connected by the cable is only marginal. The re-radiating waveguide has the advantage that the signal is not conveyed over long distances via a separate cable, but the incoming energy entering the structure is re-radiated substantially immediately from the same cavity that receives the incoming payload signal. Consequently, significant advantages are achieved in minimizing the losses in the structure.

The slot radiators placed in a row in the vertical direction make the radiation beam of the repeater structure narrower in the vertical direction. As a result, a large fan-shaped over-the-horizon radiation pattern is achieved. This may be useful in the case of the re-radiating waveguide, because a majority of payload signals, such as signals from a base station, are most likely to come from the direction of the horizon. The fan-shaped over-the-horizon beam has the advantage that it will efficiently receive a signal coming from an expected vertical angle, so that in the case of a signal coming from this direction, the efficiency of the structure is substantially increased. As the directivity of the re-radiating waveguide in the horizontal plane can be more than 10 dB outside a wall or another obstacle, the low efficiency of the structure is compensated by the strong amplification. Conventionally, the physical dimensions of a directional element installed in connection with a wall of a building allow the directivity of 10 to 20 dB towards a payload signal.

As already stated above, the distance of the slots from each other, their directions and dimensions affect the radiation properties of the slot radiators, such as the directivity and the polarization, as well as the frequency range in which the waveguide 10 is intended to operate. In the waveguide 10 according to the disclosed embodiments, the spacing of the slots is preferably half the wavelength ($\lambda/2$). Thus, the wavelength is determined according to the desired frequency range. The selected design wavelength can be, for example, the wavelength corresponding to the lowest frequency of the desired frequency range. The length of the slots corresponds to, for example, half the wavelength in free space.

Figure 3A:
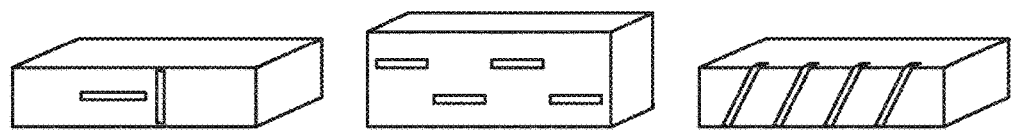
FIGS. 3a and 3b show some examples of slot radiators in waveguides, and their corresponding electric couplings.
Figure 3B:
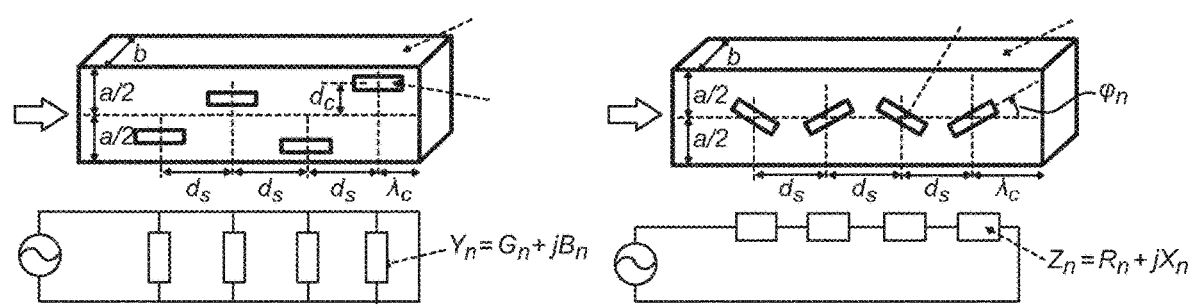

FIGS. 3a and 3b show some examples of slot radiators in waveguides, and their corresponding electric couplings.

The set of slot radiators radiating to a shadow area can be modified to cover a large fan-like area within the shadow area or to direct radiation in a pen-like beam, for example along a relatively narrow passage. By the placement of slot radiators in the shadow area, it is normally possible to provide directivity of about 10 to 20 dB for a beam in the shadow area as well. With a smaller number of slot radiators, it is possible to aim at a directivity of, for example, about 5 to 10 dB.

FIGS. 5a to 5f show a waveguide 10 according to a preferred embodiment of the invention seen from different directions. FIG. 5a shows the waveguide 10 seen from the front, which in this case means the side 12 provided with the first set 20 of slot radiators. FIG. 5b shows the waveguide 10 seen in the opposite direction, that is, from behind. In this embodiment, the second set 22 of slot radiators is formed on this rear wall 13. FIG. 5c shows the first side wall 14 of the slot radiator 10, FIG. 5d shows the second side wall 15 of the slot radiator 10, FIG. 5e shows the first end 16 of the slot radiator 10, and FIG. 5f shows the second end 17 of the slot radiator 10. Consequently, in this embodiment, the cross-section of the waveguide 10 is rectangular, but other cross-sectional shapes are feasible as well.

In the example of FIGS. 5a to 5f, the first set of slot radiators comprises 4 slot radiators and the second set of slot radiators comprises one slot radiator; in other words, this can be marked 4×1. This is only one example of the number of slot radiators. Other non-limiting examples include 4×2, 5×2, 9×1, 9×2, 8×6, etc.

FIGS. 6a to 6e show some possible geometries of slot radiators. In FIG. 6b, the slot radiators are rectangular, whereas FIGS. 6a and 6c show slot radiators in which the slots form an angle of about 90 degrees. FIGS. 6d and 6e show slot radiator shapes with rounded ends.

FIG. 7 is a principle view showing an example of placing a waveguide 10 according to FIG. 4a in connection with a building 30. The waveguide is placed inside one outer wall 31 of the building in such a way that the first set 20 of slot radiators is oriented outward from the building 30, and the second set 22 of slot radiators is oriented toward the inside 32 of the building. The wall on which the waveguide 30 is placed can depend on, for example, the direction from which signals are to be transmitted to the inside of the building. In FIG. 7, this is illustrated by a base station 40 which is thus in the direction of said outer wall 31. Inside the building 30, signals emitted by the waveguide 10 can be received by, for example, a mobile phone 61 or another device with means for receiving signals in the frequency range of the signals emitted by the waveguide.

In some cases, such waveguides can be placed on more than one wall, if there is a need to convey incoming signals from different directions to the inside of the building. Furthermore, more than one waveguide 10 according to the invention can be placed on the same wall, for example if even more efficient signal reception is desired, or if reception of signals of several different frequency ranges from the same direction is desired.

Figure 8:
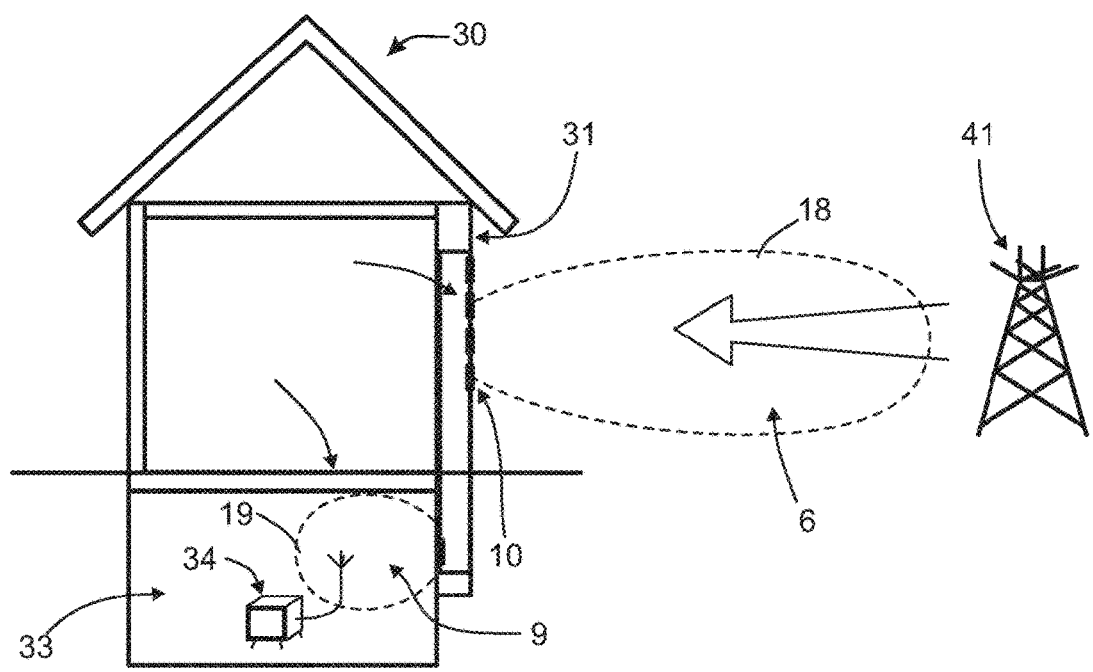
FIG. 8 is a principle view showing a second example of placing a device according to the invention in connection with a building.

FIG. 8 is a principle view showing a second example of placing a waveguide 10 according to the invention in connection with a building. In this example, the first set 20 of slot radiators is oriented outward from the building 30 toward a base station 40, and the second set 22 of slot radiators is oriented toward the basement 33 of the building. The waveguide 10 can thus extend to two floors in the height directions, in this example to a room on the ground floor and to the basement. This can facilitate the reception of, for example, a television signal broadcast from a television mast 41, by a TV receiver 34 placed in the basement 33.

Figure 10:
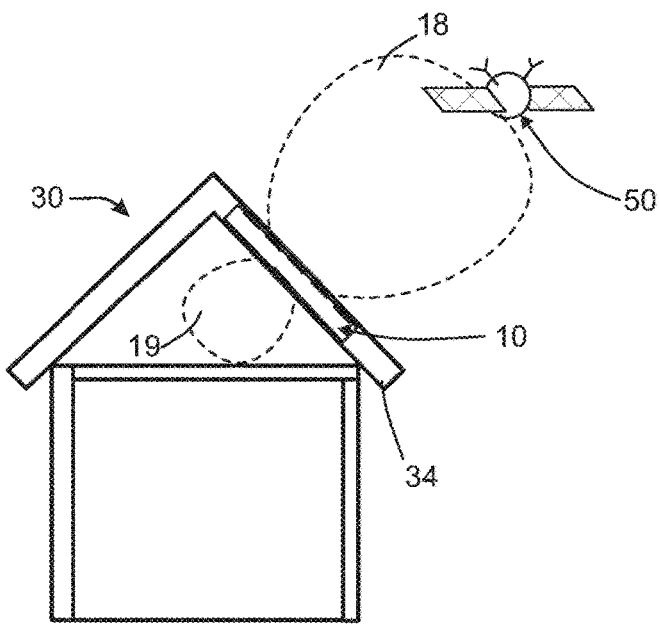
FIG. 10 is a principle view showing a third example of placing a device according to the invention in connection with a building.

FIG. 10 shows a principle view of a situation in which a waveguide 10 according to the invention is placed in the roof constructions 34 of a building, for conveying signals transmitted from a satellite 50 to the inside of the building 30.

Figure 11:
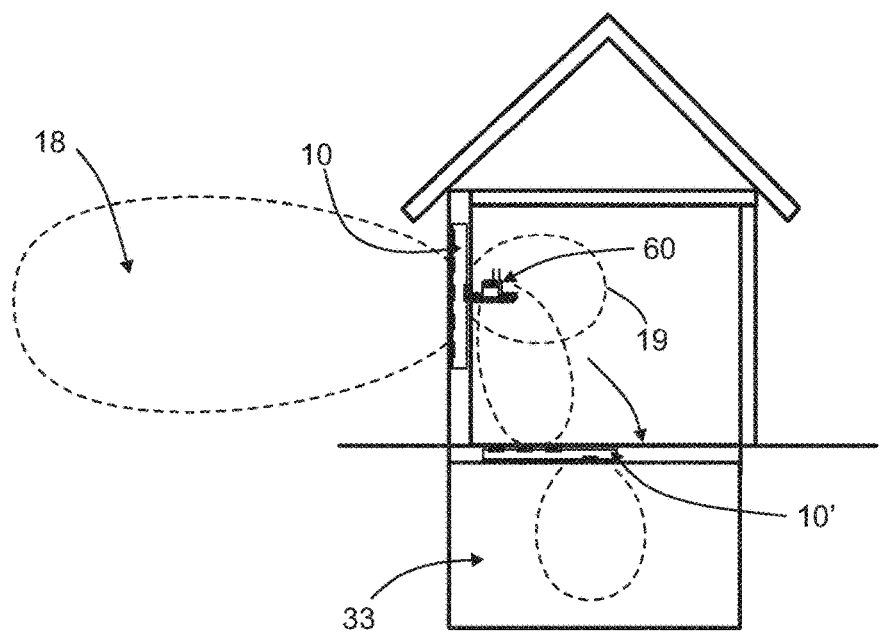
FIG. 11 is a principle view showing a fourth example of placing a device according to the invention in connection with a building.

FIG. 11 shows a fourth example of the placement of a waveguide 10 according to the invention in connection with a building. In this example, signals are transmitted by the waveguide 10 placed on the outer wall of the building to a room in which the signals are received by a wireless router 60, a mobile phone used as a router, or the like. Thus, the radiation beam 19 of the second set 22 of slot radiators of the waveguide 10 is oriented towards the wireless router, whereby a stronger signal can be directed at the wireless router. The wireless router builds up a wireless local area network (WLAN) and transmits signals received by it in this wireless local area network. In this example of FIG. 11, yet another waveguide 10' is used, which is dimensioned according to signals transmitted by the wireless router. This second waveguide 10' is embedded in the floor, whereby this second waveguide 10' can be used to expand/improve the coverage of the wireless local area network to include the basement 33 of the building 30.

In the situation of FIG. 11, the waveguide 10 placed in connection with the outer wall can be such that the strength of the signals radiated from the second set 22 of slot radiators does not need to be high in a large area, but it is sufficient that the strength is adequate in the vicinity of the wireless router.

Consequently, the waveguide 10 according to the invention is used to provide an adequate signal strength in a shadow area/shadow areas, to enable signal reception in such an area/areas as well.

By designing the set of slot radiators for the shadow area, it is also possible to create an area in which the signal strength locally exceeds the field strength received from the outer field. Such a situation is achieved when relatively more slot radiators are used outside the shadow area than inside the shadow area. The received payload signal energy is re-radiated in a desired direction. Power is distributed to each re-radiating slot radiator element. The power distributed to a slot radiator will depend on its dimensions and relative position on the conductive surface. This is represented by the conductance of the slot radiator. When a concentration of few slot radiators is used in a shadow area, the received and amplified power is distributed to only a small number of re-radiating slot radiators, whereby the power re-radiated in their vicinity may exceed the power density of the external field.

Moreover, the re-radiating waveguides have the advantage that they can be embedded in each wall of a building without visual problems. When several walls and different rooms are covered, it will not be necessary to know the direction of incidence of the signal. It is convenient to fabricate the re-radiating waveguide in a thermal insulation board of a building, whereby it is easy to use several re-radiating waveguides on the outer walls of the building. Placed on several walls of the building, the re-radiating elements equipped with wide fan-like radiation beams cover a large area of the signal environment surrounding the building. In this way, efficient signal reception is secured even if the precise direction of incidence of the payload signal were not known.

The re-radiating waveguide used in connection with a wall of the building can not only be embedded in the wall but also hung on the wall or a corresponding fixture inside the building, for example in the form of a decorative picture panel. In this case, the wall of the building should not contain layers that strongly attenuate the signal. When a slot radiator placement that strongly amplifies the signal is used on the wall oriented towards the payload signal of the re-radiator, and a concentration of few slot radiators is used on the opposite side, the re-radiator can be used to amplify the signal to be received by, for example, a wireless broadband modem. Thus, the modem or its external antenna element are brought to the immediate vicinity of the concentration of few slot radiators. In the amplified field, it is possible to considerably improve the quality of the received signal and thereby the data speed of the mobile broadband connection.

One embodiment of the re-radiating waveguide is designed in aluminium coated thermal insulation boards for buildings, but the functioning is not limited to the described objects only. The described method for amplifying the received signal can also be utilized in other cavity resonators equipped with conductive surfaces, such as energy saving windows, pieces of furniture, etc.

Although the reception of electromagnetic signals and their transmission to a shadow area have been described above, the waveguide 10 according to the invention can also function the other way around, that is, to receive electromagnetic signals by the second set 22 of slot radiators and to emit them further by the first set 20 of slot radiators. This may be necessary particularly in full-duplex wireless communication, such as communication by a mobile phone. Thus, signals from a base station can be transmitted via the structure to be received by the mobile phone, and signals generated by the mobile phone can be transmitted via the structure further to the base station.

Figures 9A, 9B:
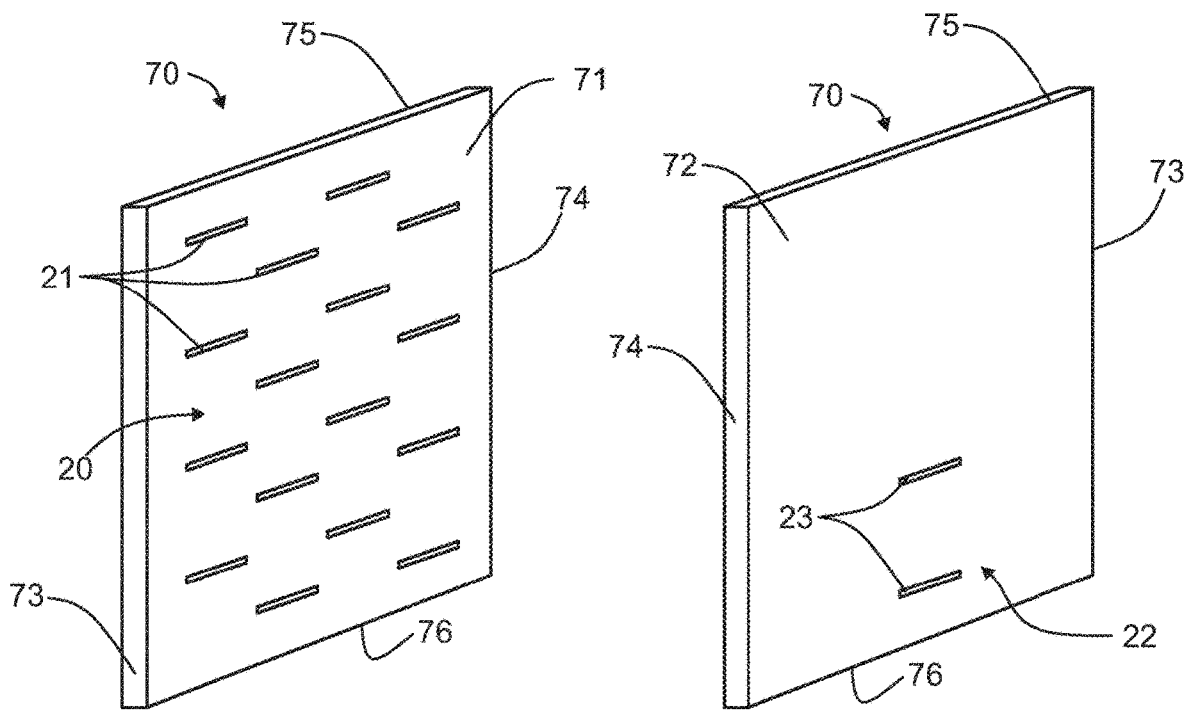
FIGS. 9a and 9b show an example of a building product comprising a device according to the invention.

We shall now describe the implementation of a waveguide 10 according to an advantageous embodiment of the invention in connection with a building product 70, with reference to FIGS. 9a and 9b. The building product 70 used in this example is a thermal insulation board whose both faces are coated with a conductive coating, such as aluminium foil 71, 72. This coating can be provided with slots which act as slot radiators. The number, shape, placement, and size of the slots are selected according to the use, to obtain the desired resonance frequency and directional pattern. The first aluminium foil 71 is provided with slots forming the first set 20 of slot radiators for the waveguide, and the second aluminium foil 72 is provided with slots forming the second set 22 of slot radiators for the waveguide. To make the structure a cavity resonator, at least two sides 73, 74 have to be coated to be conductive, for example by fastening an aluminium tape on these sides 73, 74, unless the edges of the thermal insulation board have been coated to be conductive already at the manufacturing stage. Preferably, aluminium tape is attached to each of the four sides 73 to 76. After this, the building product 70 can be installed within the wall of the building in the same way as the other thermal insulation elements, and the wall can be covered on both sides.

One advantage of such a waveguide implemented as a thermal insulation element is the fact that it can be hidden within the wall and that the element is also used as thermal insulation, whereby the waveguide does not substantially impair the thermal insulation properties of the wall.

In some cases, several thermal insulation elements of the above described kind can be placed in one and/or several walls of the building.

To provide the thermal insulation board with the desired shape, dimensions and arrangement of the slots under the worksite conditions, a template or templates can be supplied to the worksite, which template is used to make the necessary slots in the aluminium foil.

It is also possible to make the thermal insulation board comprising the waveguide according to the invention already at the factory where the thermal insulation boards are made. Thus, there may be a need to make thermal insulation boards with different electromagnetic properties, so that the building can be provided with a thermal insulation board/boards comprising a waveguide corresponding to each need.

In aluminium coated thermal insulation boards for buildings, it is often not reasonable to use too thin thermal insulation boards, so that overmoded waveguides may be suitable as repeaters in spite of the challenges in their design.

Waveguides according to the invention can also be layered on top of each other; for example, two or more thermal insulation boards of the above described type can be placed on top of each other, to make a thicker structure. In such a structure, the excitation of the resonant mode in the direction of the smallest dimension is prevented. On the other hand, if only one thermal insulation board were used, which were formed as a thicker waveguide, it could be possible that the resonant mode were excited in the smallest dimension of the board as well, that is, in the thickness direction. One non-limiting numerical example to be mentioned is a thermal insulation board having a thickness of 10 cm. Thus, by placing two such thermal insulation boards with a thickness of 10 cm on top of each other, instead of a single thermal insulation board having a thickness of 20 cm, the dimension of the waveguide in the smallest dimension can be kept 10 cm instead of 20 cm.

One use of the structure according to the above described waveguide is inside the wall of a building, but it does not need to be inside the wall to operate. However, the invention can also be utilized in other cavity-like structures, such as windows equipped with a conductive coating. Thus, the window is formed, preferably already at the manufacturing stage, such that the surface of the glass pane is provided with non-conductive points (slots), that is, is left uncoated in places where slot radiators are to be formed. Furthermore, such a window comprises two or more glass panes, and two panes are provided with a coating of the above described kind. The frame of the pane is preferably made of a conductive material, so that the coated panes and the frame can constitute a cavity resonator.

Figure 12A:
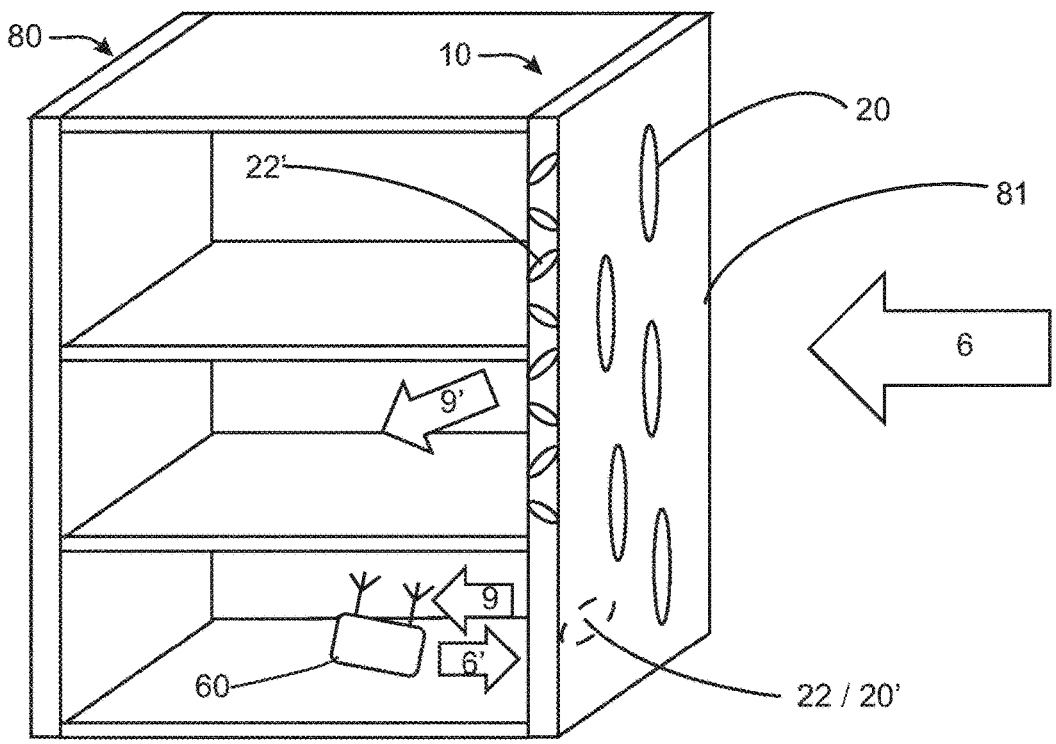
FIGS. 12a to 12c show further examples of possibilities of applying a waveguide according to the invention.

Some examples of other applications of the waveguide according to the invention include pieces of furniture. The waveguide according to the invention can be implemented in connection with, for example, a bookcase, a wall, or a table leg, some examples being shown in FIGS. 12a, 12b and 12c. In the example of FIG. 12a, one side wall 81 of a bookcase 80 is formed as a waveguide so that the outer surface of the side wall 81 is provided with slot radiators 21 of the first set 20 of slot radiators, and the surface opposite to this surface is provided with slot radiators 23 of the second set 22 of slot radiators. Furthermore, the narrower edge of the side wall 81 is provided with a third set 22' of slot radiators. The waveguide according to this embodiment functions in the following way. The slot radiators 21 of the first set 20 of slot radiators are used to receive signals 6 transmitted by, for example, a base station 40 of a mobile network (for example, 3G, 4G, LTE). These signals are transferred in the waveguide to the slot radiators 23 of the second set 22 of slot radiators, to be transmitted 9 to the environment (the room where the bookcase is placed). In the example shown in FIG. 12a, these signals are received by a wireless router 60 which converts information received from the mobile network to information to be transferred in a WLAN network, and transmits it as signals 6' of the WLAN network. These signals of the WLAN network are received by the slot radiators of the second set of slot radiators. The slot radiators 23' of the third set 22' of slot radiators in the waveguide 10 transmit these WLAN signals 9' forward into the room, whereby they can be received by devices using WLAN communication in the room. In a corresponding way, when information is transmitted in the other direction (that is, from the devices using WLAN communication up to the base station), the waveguide functions in the opposite direction. Thus, said solution improves the reception of the signals of the base station 40 in the wireless router and the reception of the signals of the wireless router in the room and possibly also in the adjacent rooms.

Figure 12B:
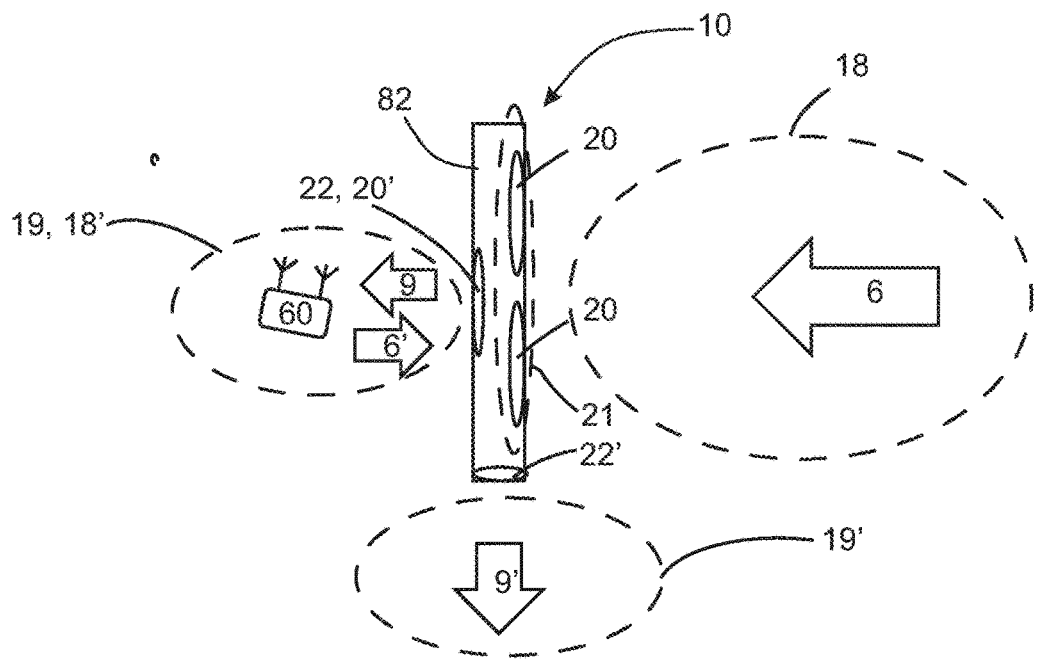

A corresponding functional waveguide relating to two different communication systems can also be implemented in connection with the walls of the building, for example in the way shown in FIG. 12b. The waveguide according to FIG. 12b, implemented in connection with a wall 82, also comprises slot radiators 21 of a first set 20 of slot radiators, slot radiators 23 of a second set 22 of slot radiators, as well as slot radiators 23' of a third set 22' of slot radiators. The slot radiators 21 of the first set 20 of slot radiators are used to receive, for example, signals 6 transmitted from a base station 40 of a mobile network (for example, 3G, 4G, LTE) which are transferred in the waveguide to the slot radiators 23 of the second set 22 of slot radiators, to be transmitted to the other side of the wall. In the example of FIG. 12b, these signals 9 are received by a wireless router 60 which converts information received from the mobile network to information to be conveyed in the WLAN network, and transmits it as signals 6' of the WLAN network. These signals of the WLAN network are received by the slot radiators of the second set of slot radiators. The slot radiators 23' of the third set 22' of slot radiators in the waveguide 10 retransmit 9' these WLAN signals into the room, whereby they can be received by devices using WLAN communication in the room, such as by a mobile phone 61, a portable computer 62, or the like. In a corresponding way, when information is transmitted in the other direction (that is, from the devices using WLAN communication up to the base station), the waveguide functions in the opposite direction.

Figure 12C:
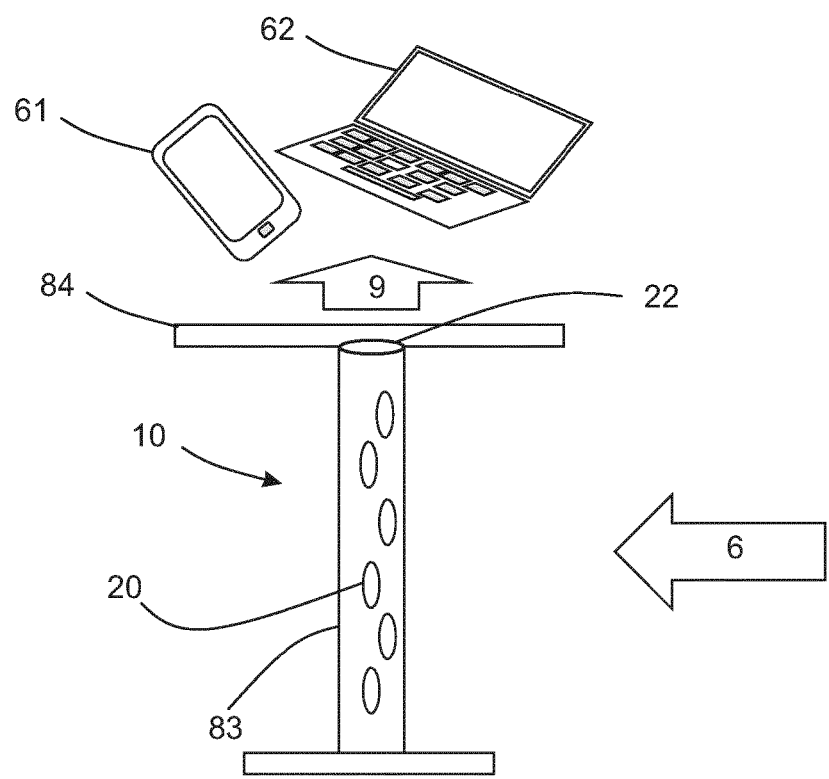

Further, FIG. 12c shows a waveguide 10 implemented in connection with a table leg. The table leg 83 used as the waveguide is provided with slot radiators 21 of the first set 20 of slot radiators. A second set 22 of slot radiators, comprising one or more slot radiators, is provided in connection with the end of the table leg 83 facing the table board 84. Thus, signals 6 received by the first set 20 of slot radiators are emitted 9 above the table board by the second set 22 of slot radiators. This means that the field strength above the table board 83 can be higher than the field strength of the directly incident signal 6.

The structure of the above described waveguides 10 can be made to function in a designed frequency range irrespective of the radio system used. Thus, the waveguide can be used, among other things, for transmitting signals of the following systems: wireless local area network (WLAN), various mobile communication systems (such as GSM, 3G, LTE), satellite positioning, such as GPS, digital terrestrial and satellite television broadcasting (for example, DVB-T, DVB-S), etc.

From what has been said above, we can conclude the following. The structure of the waveguide according to the invention is provided with a closed cavity that resonates a frequency in its operating range. Because it is a resonant structure, the dimensions of the structure are preferably substantially multiples of a quarter of the intended wavelength. The structure is also closed; in other words, a conductive coating is applied on the outer edges of the structure, or the structure is made of a conductive material that encloses an electromagnetic field. The coating/material can be any conductive coating/material, such as aluminium. The coating can also be, for example, a coating that is used in windows, such as titanium dioxide coating $TO_2$. The structure is, for example, shaped as a rectangular waveguide, but also other shapes are feasible. Conductive coatings create the edge conditions that determine the field distribution forming inside the structure. The function of the structure is designed according to the field distributions formed.

A set of slot radiators is designed for one surface of the structure. The same surface or another surface of the structure is also provided with a set of slot radiators which consists, in its minimum, of a single slot radiator but may consist of several slot radiators as well. The first and the second sets of slot radiators are distinguished, among other things, by the fact that the first set is to be oriented in such a way that it "sees" a good signal (such as a base station). The second set of slot radiators is intended to radiate the received energy to a shadow area. The shadow area can be a space inside a wall or, for example, a basement. The first and second sets of slot radiators can function on the same surface, if they are physically placed in different spaces so that the second set sees the shadow area.

The size of the slot radiators is determined according to the frequency range used. For sufficiently efficient operation, a resonant slot may be required, or the operating frequency should be close to resonance.

In the waveguide according to the invention, electromagnetic energy is not transferred to a separate transfer line or a second antenna, but the currents induced by the incoming electromagnetic field are radiated by the same structure in a predetermined new direction.

The disclosed embodiments are not limited solely to the above-presented embodiments, but it can be modified within the scope of the appended claims.

The invention claimed is:

1. A device comprising a waveguide for receiving by radiation and re-radiating electromagnetic signals to a shadow area as a passive repeater for the electromagnetic signals of a mobile communication system, the device being a building product, wherein the waveguide comprises:
   a first wall and a second wall;
   a first set of slot radiators for receiving electromagnetic signals, said first set of slot radiators comprising two or more slot radiators formed on the first wall of the waveguide to excite a mode inside the waveguide from the received electromagnetic signal, wherein the waveguide is an overmoded waveguide; and
   a second set of slot radiators comprising two or more slot radiators for transmitting electromagnetic signals from the waveguide on the basis of the excited mode, said second set of slot radiators being formed on the second wall of the waveguide;
   wherein the waveguide has a substantially rectangular cross-sectional shape comprising a first wall; a second wall that is opposite to, spaced from, and substantially parallel with the first wall; and
   a directivity from 10 dB to 20 dB is provided by the placement of the slot radiators in the shadow area or outside a building wall.

2. The device according to claim 1, wherein the excited mode comprises a current pattern on the conductive walls of the cavity inside the waveguide, wherein the second set of slot radiators comprises parallel slot radiators arranged to intersect a surface current path of the excited mode to passively transfer the electromagnetic energy to the shadow area.

3. The device according to claim 1, wherein the waveguide is embedded in a wall of a building, and the slot radiators are parallel to provide a directivity from 10 dB to 20 dB in the shadow area behind the building wall, or outside the building wall.

4. The device according to claim 1, wherein the excitation of a resonant mode of the waveguide in the direction of a smallest dimension is prevented.

5. A device according to claim 4, wherein said waveguides are layered on top of each other.

6. The device according to claim 1, wherein the radiation pattern of the slot radiators covers the shadow area with a fan-like pattern or a pen-like pattern.

7. The device according to claim 1, wherein the building product is a thermal insulation board having two faces, which are coated with a conductive coating, and the coating is provided with slots that form the slot radiators.

8. The device according to claim 1, wherein the building product is a window equipped with a conductive coating, where the slot radiators are formed with non-conductive slots provided in the coating, and the window comprises two or more glass panes, where
   the waveguide has a substantially rectangular cross-sectional shape, whereby the waveguide comprises the first wall; the second wall that is opposite to, spaced from, and substantially parallel with the first wall, and
   the waveguide is overmoded in a TE- or TM mode, and the excitation of the resonant mode of the waveguide in the direction of the smallest dimension is prevented.

9. A method for receiving by radiation and re-radiating electromagnetic signals by a device that is in connection with a building product, and the device comprising at least a waveguide, wherein the method comprises:
   receiving electromagnetic signals by facing a first set of slot radiators comprising one or more slot radiators towards a payload signal outside a building to excite a resonant mode of an overmoded cavity resonator inside the waveguide from the received electromagnetic signals, and
   transmitting said electromagnetic signals to a shadow area by placing a second set of slot radiators comprising two or more slot radiators in said shadow area, where said second set of slot radiators intersects the surface current pattern of the excited resonant mode in said cavity resonator;
   wherein the waveguide has a substantially rectangular cross-sectional shape comprising a first wall; a second wall that is opposite to, spaced from, and substantially parallel with the first wall; and
   a directivity from 10 dB to 20 dB is provided by the placement of the slot radiators in the shadow area or outside a building wall.

\* \* \* \* \*